US011893879B2

(12) United States Patent
Takeda et al.

(10) Patent No.: US 11,893,879 B2
(45) Date of Patent: Feb. 6, 2024

(54) STIMULUS PRESENTATION APPARATUS, STIMULUS PRESENTATION METHOD AND PROGRAM

(71) Applicant: Nippon Telegraph and Telephone Corporation, Tokyo (JP)

(72) Inventors: Toki Takeda, Musashino (JP); Arinobu Niijima, Musashino (JP); Takafumi Mukouchi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/773,776

(22) PCT Filed: Nov. 7, 2019

(86) PCT No.: PCT/JP2019/043635
§ 371 (c)(1),
(2) Date: May 2, 2022

(87) PCT Pub. No.: WO2021/090433
PCT Pub. Date: May 14, 2021

(65) Prior Publication Data
US 2023/0005344 A1    Jan. 5, 2023

(51) Int. Cl.
*H04B 3/36*    (2006.01)
*G08B 6/00*    (2006.01)

(52) U.S. Cl.
CPC ..................... *G08B 6/00* (2013.01)

(58) Field of Classification Search
CPC . G08B 6/00; G06F 3/016; G06F 3/011; A63F 13/28; A63G 31/00; A63J 25/00; G02B 27/0149
See application file for complete search history.

(56) References Cited

U.S. PATENT DOCUMENTS

| | | | |
|---|---|---|---|
| 2020/0364994 A1* | 11/2020 | Birnbaum | G08B 21/18 |
| 2023/0033892 A1* | 2/2023 | Nakagawa | G06F 3/04847 |
| 2023/0152891 A1* | 5/2023 | Yokoyama | G06F 3/0482 715/702 |

FOREIGN PATENT DOCUMENTS

| | | |
|---|---|---|
| JP | 2018171319 | 11/2018 |
| JP | 2019176934 | 10/2019 |

(Continued)

OTHER PUBLICATIONS

Ranasinghe et al., "Ambiotherm: Enhancing Sense of Presence in Virtual Reality by Simulating Real-World Environmental Conditions," CHI 2017, May 6, 2017, pp. 1731-1742.

*Primary Examiner* — Toan N Pham
(74) *Attorney, Agent, or Firm* — Fish & Richardson P.C.

(57) ABSTRACT

A stimulus presentation device 13 that stimulates a user with air from a plurality of air guns 14 arranged so as to surround the user includes a control unit 132 that determines respective ejection times at which a plurality of air streams are to be ejected at given time intervals which allow the user to perceive an apparent motion as well as respective ejection azimuth directions in which the plurality of air streams are to be ejected and causes the air streams to be sequentially ejected from the respective air guns 14 disposed in the individual ejection azimuth directions at the individual ejection times and an adjustment unit that determines a plurality of different body sites on a body of the user to which the plurality of air streams are to be applied and adjusts respective ejection angles of the individual air guns 14 such that respective muzzles of the air guns 14 are pointed at the plurality of body sites.

19 Claims, 7 Drawing Sheets

(56) References Cited

FOREIGN PATENT DOCUMENTS

| WO | WO-2013025823 A2 | * | 2/2013 | ......... A61H 23/0236 |
| WO | WO-2021090433 A1 | * | 5/2021 | ............... G08B 6/00 |

* cited by examiner

STIMULUS PRESENTATION APPARATUS, STIMULUS PRESENTATION METHOD AND PROGRAM

CROSS-REFERENCE TO RELATED APPLICATIONS

This application is a National Stage application under 35 U.S.C. § 371 of International Application No. PCT/JP2019/043635, having an International Filing Date of Nov. 7, 2019. The disclosure of the prior application is considered part of the disclosure of this application, and is incorporated in its entirety into this application.

TECHNICAL FIELD

The present invention relates to a stimulus presentation device, a stimulus presentation method, and a stimulus presentation program.

BACKGROUND ART

A virtual-experience 3D content uses technology of providing a staged sense of presence by stimulating not only a sense of vision and a sense of hearing, but also a sense of touch. Specifically, by using wind to stimulate the sense of touch, the technology allows a user to feel as if a virtual target object such as a physical object or a human were present with the user. For example, in a movie theater or an attraction, wind is used to stimulate the sense of touch of the user to allow the content to provide a sense of presence. However, the wind for staging in the movie theater or the like is sporadic, and is not coincident with delicate movement of the virtual target object. In view of this, in NPL 1, a small-sized air blower is attached to a head-mounted display used for VR (Virtual Reality) video reproduction to control wind.

CITATION LIST

Non Patent Literature

[NPL 1] Nimesha Ranasinghe and four others, "Ambiotherm: Enhancing Sense of Presence in Virtual Reality by Simulating Real-World Environmental Conditions", CHI 2017, May 6-11, 2017, Denver, CO, USA, p. 1731-p. 1752

SUMMARY OF THE INVENTION

Technical Problem

However, since the air blower is used in NPL 1, wind generated thereby is diffused to reach the user. Accordingly, it is difficult to delicately stimulate the sense of touch of the user. In addition, NPL 1 assumes that wearing the head-mounted display is a requirement, which places a heavy burden on the user.

The present invention has been achieved in view of the circumstances described above, and an object of the present invention is to provide technology that allows a user to feel continuous wind without wearing a device such as a head-mounted display.

Means for Solving the Problem

A stimulus presentation device in an aspect of the present invention is a stimulus presentation device that stimulates a user with air from a plurality of air guns arranged so as to surround the user and includes: a control unit that determines respective ejection times at which a plurality of air streams are to be ejected at given time intervals which allow the user to perceive an apparent motion as well as respective ejection azimuth directions in which the plurality of air streams are to be ejected and causes the air streams to be sequentially ejected from the respective air guns disposed in the individual ejection azimuth directions at the individual ejection times; and an adjustment unit that determines a plurality of different body sites on a body of the user to which the plurality of air streams are to be applied and adjusts respective ejection angles of the individual air guns such that respective muzzles of the air guns are pointed at the plurality of body sites.

A stimulus presentation method in another aspect of the present invention is a stimulus presentation method that stimulates a user with air from a plurality of air guns arranged so as to surround the user and causes a stimulus presentation device to perform the steps of: determining respective ejection times at which a plurality of air streams are to be ejected at given time intervals which allow the user to perceive an apparent motion as well as respective ejection azimuth directions in which the plurality of air streams are to be ejected and causing the air streams to be sequentially ejected from the respective air guns arranged in the individual ejection azimuth directions at the individual ejection times; and determining a plurality of different body sites on a body of the user to which the plurality of air streams are to be applied and adjusting respective ejection angles of the individual air guns such that respective muzzles of the air guns are pointed at the plurality of body sites.

Still another aspect of the present invention is a stimulus presentation program that causes a computer to function as the stimulus presentation device described above.

Effects of the Invention

According to the present invention, it is possible to provide technology that allows a user to feel continuous wind without wearing a device such as a head-mounted display.

DESCRIPTION OF EMBODIMENTS

Figure 1:
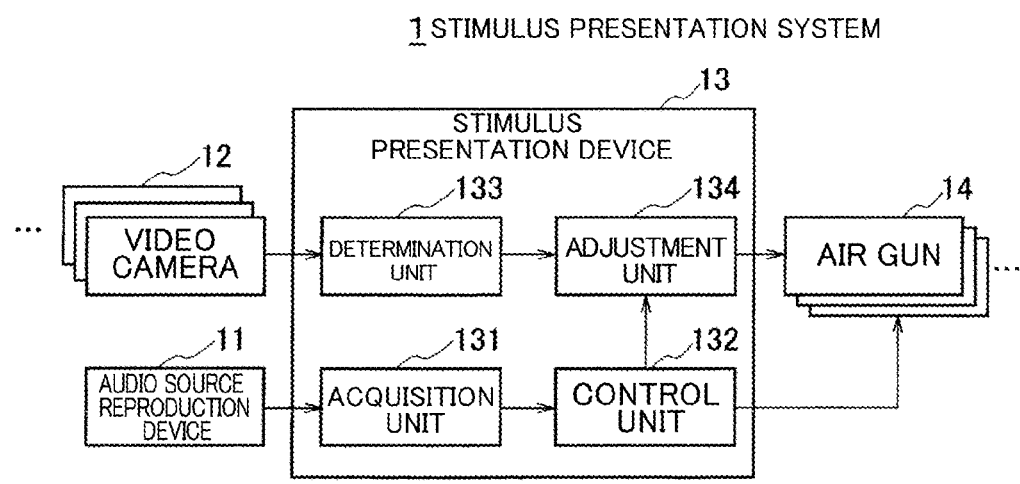
FIG. 1 is a diagram illustrating an overall configuration of a stimulus presentation system.

Referring to the drawings, an embodiment of the present invention will be described below. In the description of the drawings, identical parts are given identical reference numerals, and a description thereof is omitted.

OUTLINE OF INVENTION

The present invention discloses a method for presenting wind stimuli using air guns without requiring wearing of a device such as a head-mounted display so as to allow a user to feel continuous wind and also feel continuous wind resulting from movement of a virtual target object reproduced by a virtual-experience 3D content. By using the air guns, it is possible to stimulate a specified region of the user even at distances from the user and eliminate the need to wear of the device. However, even when only the air guns are used, it is difficult to represent continuous movement of the wind.

Therefore, in the present invention, attention is focused on apparent motion perception and, using the air guns, the wind stimuli are presented to two or more different points on a body surface of the user at appropriately timed intervals to allow the user to feel sensations of motion at the individual points on the body surface. Also, in the present invention, attention is focused on an audiotactile interaction, and sites to which wind is to be presented are brought into synchronization with a normal position of an audio image generated from a virtual target object to allow the user to feel continuous wind resulting from the movement of the virtual target object. Thus, it is possible to allow the user to feel the continuous wind without wearing a device. In addition, it is possible to allow the user to feel the continuous wind as continuous wind resulting from the movement of the virtual target object and realize staging that provides a sense of presence of the virtual target object.

Overall Configuration of Stimulus Presentation System 1

FIG. 1 is a diagram illustrating an overall configuration of a stimulus presentation system 1. The stimulus presentation system 1 includes an audio source reproduction device 11, a plurality of video cameras 12, a stimulus presentation device 13, and a plurality of air guns 14. The stimulus presentation device 13 is physically and electrically connected to the audio source reproduction device 11, the plurality of video cameras 12, and the plurality of air guns 14 to be communicative therewith.

The audio source reproduction device 11 is a device that reproduces an audio source. The audio source reproduction device 11 reproduces, e.g., an audio source of a virtual-experience 3D content. The audio source of the virtual-experience 3D content is an extremely short audio source such as, e.g., a sound of footsteps passing before eyes of the user. A length of the audio source may also be large. When the length of the audio source is large, the stimulus presentation device 13 subsequent to the audio source reproduction device 11 divides the audio source to extract a specified audio source. The audio source reproduction device 11 can be implemented using, e.g., audio equipment in a city or a personal computer in the city.

The plurality of video cameras 12 are disposed so as to surround the user listening to a reproduced sound from the audio source described above. The plurality of video cameras 12 are devices that images the user at different angles. The video cameras 12 can be implemented using, e.g., video cameras in the city.

The stimulus presentation device 13 is a device that uses audio image normal position information representing the normal position of the audio image (e.g., a sound of footsteps) acquired from the audio source reproduction device 11 and a plurality of user videos imaged at different angles by the plurality of video cameras 12 to control ejection times at which respective air streams are ejected from two or more of the plurality of air guns 14, wind power strengths of the air streams, and ejection angles of the air streams. The stimulus presentation device 13 can be implemented using, e.g., a computer (such as, e.g., a server device or a client device in the city) including a CPU, a memory, a communication interface, and the like.

The plurality of air guns 14 are arranged so as to surround the user listening to the reproduced sound from the audio source described above. The plurality of air guns 14 are devices that adjust, based on control by the stimulus presentation device 13, respective ejection angles thereof to the ejection angles of the air streams set by the stimulus presentation device 13 and eject the air streams with ejection strengths of the air streams set by the stimulus presentation device 13 at the ejection times of the air streams set by the stimulus presentation device 13. Each of the air guns 14 can be implemented by combining, e.g., a cylindrical body that ejects the air stream, an ejection control unit such as a CPU that ejects the air stream with the set strength at the set time, and a muzzle control unit such as a CPU that controls an orientation of a muzzle of the cylindrical body.

Configuration of Stimulus Presentation Device 13

As illustrated in FIG. 1, the stimulus presentation device 13 includes an acquisition unit 131, a control unit 132, a determination unit 133, and an adjustment unit 134.

The acquisition unit 131 has a function of acquiring, from the audio source reproduction device 11, audio image normal position information. As described above, the audio image normal position information is information representing the normal position of the audio image. The audio image is a spatial image of a sound perceived by the user. The normal position of the audio image is a position of the audio image viewed from the user. The audio image normal position information includes information such as a position of the audio image viewed from the user at a predetermined time after reproduction of the content, an azimuth direction thereof, a distance thereof, and the like. The acquisition unit 131 can acquire, from the audio source reproduction device 11, the audio image normal position information in a format such as MIDI data or B-Format.

The control unit 132 has a function of determining, using the audio image normal position information described above, the respective ejection times at which the plurality of air streams are to be ejected, the respective wind power strengths thereof, and respective ejection azimuth directions thereof and causing the individual air guns 14 disposed in the respective ejection azimuth directions to sequentially eject the individual air streams with the respective wind power strengths at the respective ejection times.

The ejection times of the air streams are set at given time intervals which allow the user to perceive an apparent motion. The given time intervals are set within a range of, e.g., 10 to 200 msec. By setting the time intervals between the individual ejection times at which the plurality of air streams is to be ejected within the range of 10 to 200 msec, an effect of allowing the user to feel a sensation of motion is achieved.

Each of the wind power strengths of the air streams is set based on a magnitude of a distance between the user and the normal position of the audio image. The control unit 132 changes the number of the air streams to be ejected toward a body site (described later) and causes, when the number of the air streams to be ejected is plural, the plurality of air streams to be continuously ejected at given short time intervals. The control unit 132 changes, based on the magnitude of the distance between the user and the normal position of the audio image, the number of the air streams to be ejected toward the body site (described later). For example, when the distance from the user to the normal position of the audio image is short, the control unit 132 causes the air stream to be continuously ejected more than once to enhance wind power while, when the distance from the user to the normal position of the audio image is long, the control unit 132 causes the air stream to be ejected once to reduce the wind power. In other words, the control unit 132 controls an intensity of the stimulation by changing the number of the air streams to be ejected. The control unit 132 may also change an amount of the air stream to be pushed out toward the body site (described later), a speed at which the air stream is pushed out, or the both (the amount of the air stream to be pushed out and the speed at which the air stream is pushed out) depending on the magnitude of the distance between the user and the normal position of the audio image. For example, when an amplitude of a cone of a speaker unit is used as a method of controlling the pushing out of the air streams from the air guns 14, the cone is typically moved using one waveform as an output signal to thus push out the air stream. Consequently, the amount of the air stream to be pushed out is adjusted using a magnitude of the amplitude (sound pressure level), and the speed at which the air stream is pushed out is adjusted using a frequency of the output signal (frequency of oscillation). Thus, the intensity of the stimulation applied to the user is controlled.

The determination unit 133 has a function of receiving, from the plurality of video cameras 12, the plurality of user videos at the different angles. The determination unit 133 has a function of determining a body region of the user to which stimuli are to be presented by using the plurality of user videos. The body region to be determined is, e.g., a face, an arm, a neck, or the like. Note that the body region to be determined is preferably a region in which skin is exposed from clothes.

The adjustment unit 134 has a function of determining, within a range of the body region of the user described above, a plurality of different body sites on the body of the user to which the plurality of air streams is to be applied and adjusting ejection angles of the individual air guns 14 such that the respective muzzles of the air guns 14 are pointed at the plurality of body sites. The individual air guns 14 are those of the plurality of air guns 14 arranged so as to surround the user which are disposed in the respective emission azimuth directions determined by the control unit 132. Consequently, the determined body sites correspond to the normal position of the audio image. By causing the body sites to correspond to the normal position of the audio image, an effect of allowing the applied air streams to be felt as the wind resulting from the movement of the virtual target object is achieved. Note that the adjustment unit 134 preferably determines the plurality of body sites within the range of the exposed body region of the user.

First Modification of Configuration of Stimulus Presentation Device 13

The stimulus presentation device 13 can be implemented by a computer. The audio source reproduction device 11 can also be implemented by a computer such as a personal computer in a city. The ejection control unit and the muzzle control unit of each of the air guns 14 can also be implemented by a computer such as a CPU. Therefore, in the stimulus presentation device 13, the audio source reproduction device 11 may be included as a functional unit thereof serving as an audio source reproduction unit, and each of the ejection control unit and the muzzle control unit of the air gun 14 may also be included as a functional unit thereof.

Second Modification of Configuration of Stimulus Presentation Device 13

The control unit 132 controls the ejection times and the wind power strengths of the air streams from the air guns 14. The adjustment unit 134 controls the ejection angles of the air streams from the air guns 14. The control unit 132 and the adjustment unit 134, which are common in terms of controlling the air guns 14, may also be integrally configured as one functional unit.

Third Modification of Configuration of Stimulus Presentation Device 13

It may also be possible to provide a Peltier element or the like in the vicinity of each of the air guns 14 and control a temperature of the air stream ejected from the air gun 14. By, e.g., increasing the temperature of the air ejected from the air gun 14, it is possible to allow a sensation of blowing hot wind to be felt. Conversely, by lowering the temperature of the air stream ejected from the air gun 14, it is possible to allow a sensation of blowing cool wind to be felt. This can increase types of wind to be experienced by the user.

Arrangement of Video Cameras 12 and Air Guns 14

Figure 2:
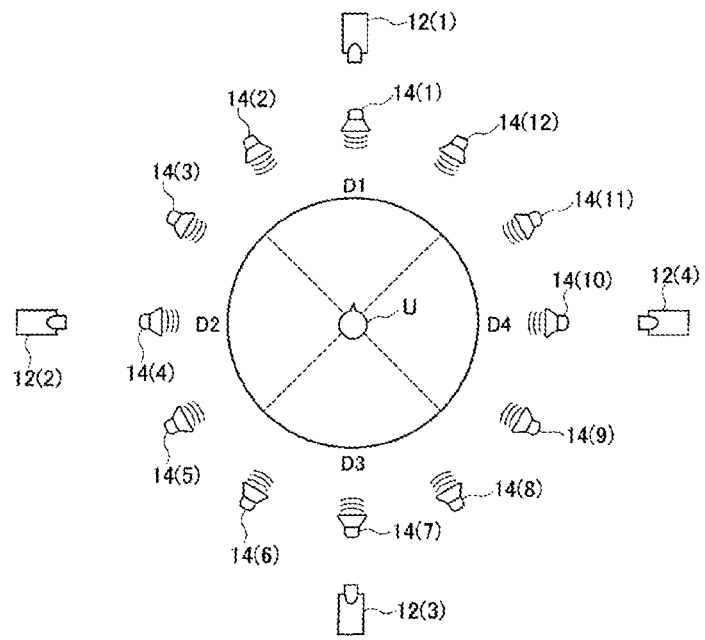
FIG. 2 is a diagram illustrating an example of a layout of video cameras and air guns.

FIG. 2 is a diagram illustrating an example of a layout of the video cameras 12 and the air guns 14. In the present embodiment, four video cameras 12(1) to 12(4) are disposed in a front azimuth direction D1 from a user U, in a left azimuth direction D2 from the user U, in a rear azimuth direction D3 from the user U, and in a right azimuth direction D4 from the user U. Also, in the present embodiment, twelve air guns 14(1) to 14(12) are arranged in a circular configuration in the front azimuth direction D1, the left azimuth direction D2, the rear azimuth direction D3, and the right azimuth direction D4 from the user U. In each of the azimuth directions D1 to D4, the three air guns 14 are disposed. The total numbers of the video cameras 12 and the air guns 14 are optional. It may also be possible to newly add the video cameras 12 in a right diagonal front azimuth direction from the user U or the like. It may also be possible to dispose the two air guns 14 in each of the azimuth directions.

Operation of Stimulus Presentation System 1

Figure 3:
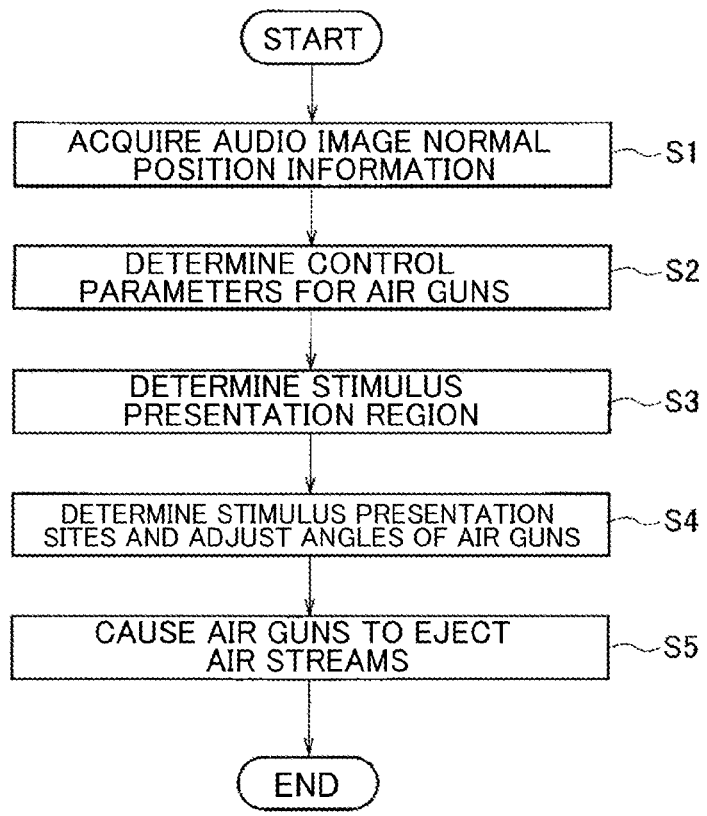
FIG. 3 is a flow chart illustrating an operation flow of the stimulus presentation system.
Figure 4:
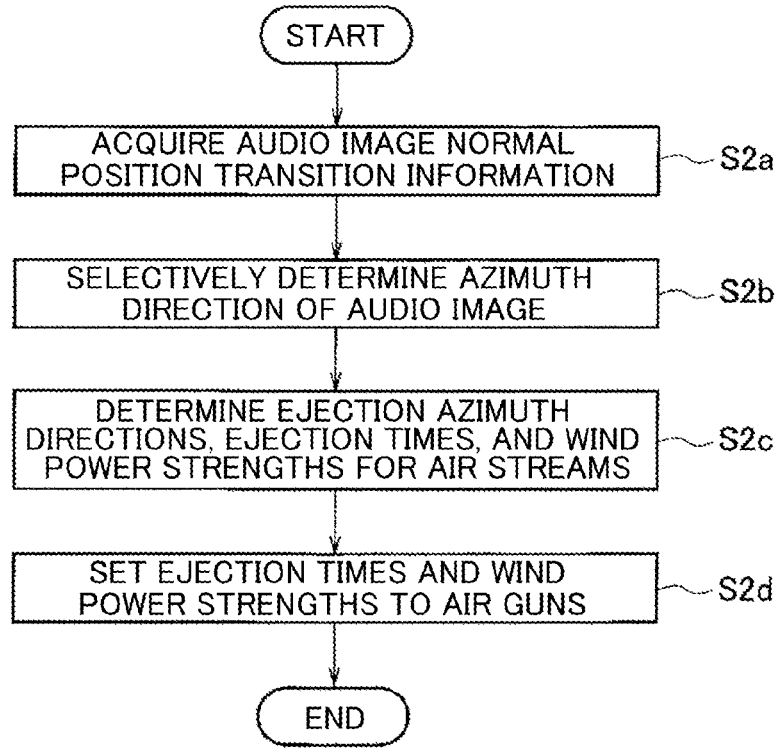
FIG. 4 is a flow chart illustrating an operation flow of a control unit of a stimulus presentation device.

FIG. 3 is a diagram illustrating an operation flow of the stimulus presentation system 1. FIG. 4 is a diagram illustrating an operation flow of the control unit 132 of the stimulus presentation device 13 in Step S2 in FIG. 3.

Step S1;

The acquisition unit 131 of the stimulus presentation device 13 acquires, from the audio source reproduction device 11, the audio image normal position information representing the normal position of a target audio image (e.g., a sound of footsteps) in a format such as MIDI data or B-Format. The audio image normal position information includes the information such as the position of the audio image viewed from the user at the predetermined time after the reproduction of the content, the azimuth direction thereof, and the distance thereof.

Step S2;

The control unit 132 of the stimulus presentation device 13 uses the acquired audio image normal position information to determine control parameters for controlling the plurality of air guns 14, such as the respective ejection times at which the plurality of air streams is to be ejected, the respective wind power strengths thereof, and the respective ejection azimuth directions thereof. Then, the control unit 132 sets, to the respective air guns 14 disposed in the determined ejection azimuth directions, the determined ejection times and wind power strengths. The control unit 132 also reports, to the adjustment unit 134, the determined ejection azimuth directions. A detailed description will be given below of an operation in Step S2.

Step S2*a*;

The control unit 132 acquires normal position transition information of the target audio image from the audio image normal position information. At this time, it is assumed that the normal position of one audio image continuously moves.

For example, an audio source of a virtual-experience 3D content is typically long and includes a plurality of or plural types of audio images, and accordingly the control unit 132 divides a length of the audio source, which is L-second, into T-second intervals to allow one audio source to include one audio image. Then, the control unit 132 equally divides each of the T-second intervals resulting from the division by t1, t2, and t3 and acquires, from the audio image normal position information, the respective normal positions of the target audio image at the individual times t1, t2, and t3.

Figure 5:
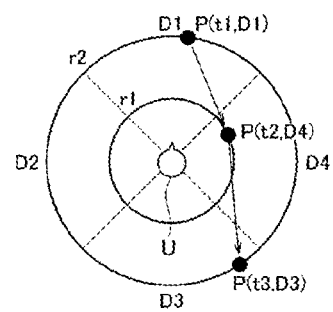
FIG. 5 is a diagram illustrating an example of a normal position transition of a target audio image.

For example, as illustrated in FIG. 5, the control unit 132 acquires the audio image normal positions P(t1, D1), P(t2, D4), and P(t3, D3) of the target audio image at the individual times t1, t2, and t3. Each of solid circles represents the target audio image. The target audio image moves from a front side of the user U closer to a right side thereof and further to a rear side thereof past the user U. D1 to D4 denote the azimuth directions or positions of the target audio image viewed from the user U. A time period between t1 and t3 is an extremely short time interval such as a time period during which a sound of footsteps passes before eyes of the user U. Note that the number of segments into which each of the T-second intervals is divided is optional.

Step S2*b*;

The control unit 132 selectively determines, based on the audio image normal position transition information, the azimuth direction of the target audio image.

For example, at the middle time t2 corresponding to the middle one of t1, t2, and t3, the control unit 132 determines in which one of the azimuth directions or positions D1 to D4 the target audio image is included. Thus, the control unit 132 specifies the main azimuth direction or position of the target audio image relative to the user. By ejecting the air streams in the specified azimuth direction, i.e., associating the normal position of the audio image with sites on the user to be reached by the air streams, it is possible to synchronize the normal position of the audio image generated from the virtual target object with sites to which wind is to be presented.

In the case of the example described above, the audio image normal position of the target audio image at the middle time t2 is P(t2, D4), and therefore the control unit 132 selectively determines the azimuth direction of the target audio image to be D4. Specifically, the control unit 132 selectively determines the right azimuth direction D4 from among the front azimuth direction D1, the left azimuth direction D2, the rear azimuth direction D3, and the right azimuth direction D4 each illustrated in FIG. 6. Note that, when the T seconds are equally divided by t1, t2, t3, and t4 into even-numbered segments, the control unit 132 selectively determines the azimuth direction of the target audio image by using a middle time determined based on "(t2+t3)/2".

Step S2*c*;

The control unit 132 determines, based on the azimuth direction of the target audio image, the ejection azimuth directions of the air streams and also determines the ejection times thereof, and determines, based on the audio image normal position information, the wind power strengths of the air streams.

Figure 6:
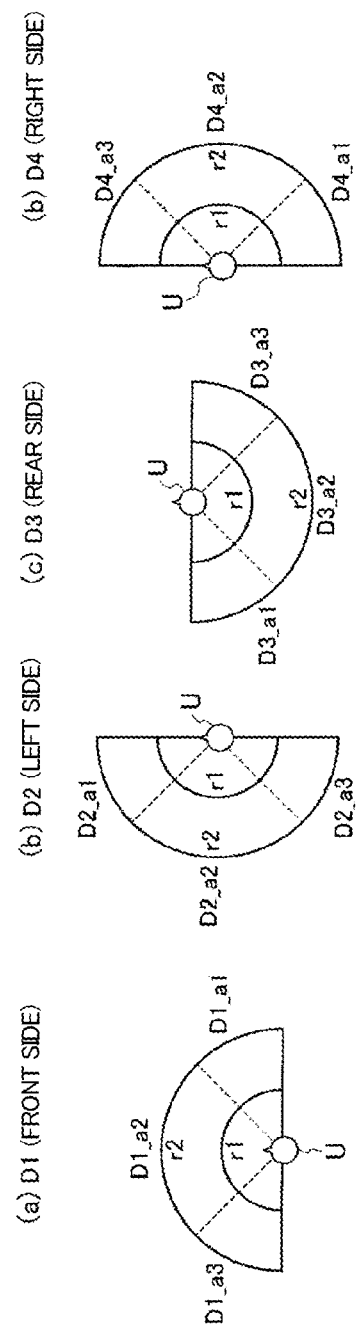
FIG. 6 is a diagram illustrating an example of azimuth direction classification when viewed from a user.

For example, the control unit 132 determines, based on the right azimuth direction D4 in FIG. 6 selectively determined, the ejection azimuth directions of the air streams to be D4_a3, D4_a2, and D4_a1. At this time, the control unit 132 may also determine, based on the respective determined ejection azimuth directions of the air streams, the air guns 14 scheduled to be used that are disposed in the respective ejection azimuth directions. For example, the control unit 132 determines the air gun 14(12) located in the ejection azimuth direction D4_a3, the air gun 14(11) located in the ejection azimuth direction D4_a2, and the air gun 14(8) located in the ejection azimuth direction D4_a1.

For example, the control unit 132 determines, based on the middle time t2, the respective ejection times of the air streams corresponding to individual normal position transition times (t1, t2, t3) of the target audio image to be (t2−x, t2, t2+x), where x represents a time period which allows the user to perceive an apparent motion. For example, x represents a value within a range of 10 to 200 msec. When the three air guns are used for the individual normal position transition times (t1, t2, t3, t4) of the target audio image, the control unit 132 sets a middle time tm="(t2+t3)/2", and determines the ejection times of the individual air streams to be (tm−x, tm, tm+x).

For example, the control unit 132 acquires, from the audio image normal position information, respective distances from the user to the normal positions of the target audio image at the individual normal position transition times (t1, t2, t3) of the target audio image. For example, the control unit 132 assumes that distances based on the user U are r1, r2, . . . , acquires r2 as the distance at the time t1, acquires r1 as the distance at the time t2, and acquires r2 as the distance at the time t3.

Thus, the control unit 132 calculates respective control parameters (t2−x, r2, D4_a3), (t2, r1, D4_a2), and (t2+x, r2, D4_a1) at the individual normal position transition times (t1, t2, t3) of the target audio image. Each of the control parameters includes the ejection time, the distance between the user and the target audio image, and the ejection azimuth direction which are arranged in this order in the parentheses. The control unit 132 may also convert r representing the distance between the user and the target audio image to the wind power strength. In the case of r1, the control unit 132 sets a wind power strength 1 corresponding to a high power while, in the case of r2, the control unit 132 sets a wind power strength 2 corresponding to a low power.

Step S2*d*;

The control unit 132 sets the control parameters to the individual air guns 14 to be used. In addition, the control unit 132 reports, to the adjustment unit 134, the control parameters. When the air guns 14 scheduled to be used are determined in advance based on the ejection azimuth directions, the control unit 132 may also report, to the adjustment unit 134, the control parameters in combination with respective identifiers of the air guns 14 scheduled to be used.

For example, the control unit 132 sets, based on the control parameter (t2−x, r2, D4_a3), the ejection time t2−x to the air gun 14(12) located in the ejection azimuth direction D4_a3 and sets the distance r2 or the wind power strength 2.

For example, the control unit 132 sets, based on the control parameter (t2, r1, D4_a2), the ejection time t2 to the air gun 14(11) located in the ejection azimuth direction D4_a2 and sets the distance r1 or the wind power strength 1.

For example, the control unit 132 sets, based on the control parameter (t2+x, r2, D4_a1), the ejection time t2+x to the air gun 14(8) located in the ejection azimuth direction D4_a1 and sets the distance r2 or the wind power strength 2.

The above is details of Step S2.

Step S3;

The determination unit 133 of the stimulus presentation device 13 uses the plurality of user videos at the different angles received from the plurality of video cameras 12 to determine the body region of the user to which the stimuli are to be presented. For example, the determination unit 133 determines the face of the user to be the region to which the stimuli are to be presented.

Step S4;

The adjustment unit 134 of the stimulus presentation device 13 determines, within the range of the determined body region of the user, the plurality of different body sites on the body of the user to which the plurality of air streams are to be applied, and adjusts the ejection angles of the individual air guns 14 such that the respective muzzles of the air guns 14 are pointed at the plurality of body sites. The air guns 14 to be adjusted are the air guns 14 disposed in the respective ejection azimuth directions reported from the control unit 132. In the case of the example described above, the air guns 14 are the air gun 14(8), the air gun 14(11), and the air gun 14(12).

Figure 7:
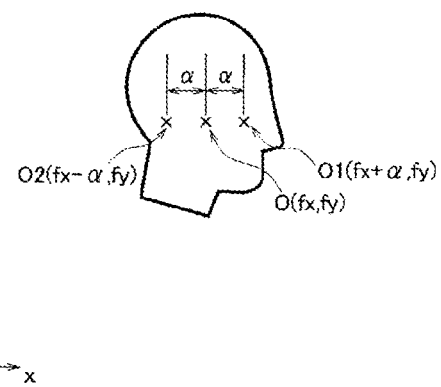
FIG. 7 is a diagram illustrating an example of a body region and body sites of a user to be stimulated.

For example, the adjustment unit 134 uses the plurality of user videos received from the four video cameras 12(1) to 12(4) to calculate a center point of the determined profile of the user. Then, as illustrated in FIG. 7, the adjustment unit 134 assumes that points reached by moving the calculated center point O(fx, fy) serving as a reference by an optional distance/interval a in each of left and right directions are O1(fx+α, fy) and O2 (fx−α, fy).

Then, the adjustment unit 134 determines an ejection direction of the air gun 14 (11) such that the muzzle of the air gun 14(11) is pointed at the center point O(fx, fy) and adjusts the muzzle of the air gun 14(11). The adjustment unit 134 adjusts the muzzle of the air gun 14(12) such that the muzzle thereof is pointed at O1(fx+α, fy). The adjustment unit 134 adjusts the muzzle of the air gun 14(8) such that the muzzle thereof is pointed at O2(fx−α, fy).

For example, when the number of the air guns disposed in D1 to D4 is an even number w, the adjustment unit 134 determines the respective ejection directions thereof to be (fx−α1, fy), . . . , (fx−αw/2, fy), (fx+α1, fy), . . . , (fx+αw/2, fy). When the number of the air guns disposed in D1 to D4 is an odd number z, the adjustment unit 134 determines the respective ejection directions thereof to be (fx, fy), (fx−α1, fy), . . . , (fx−α(z−1)/2, fy), (fx+α1, fy), . . . , (fx+α(z−1)/2, fy).

Step S5;

Of the plurality of air guns 14, each of the air guns 14 for which the control parameters are set and the ejection angles are adjusted by the stimulus presentation device 13 ejects the air stream with the ejection strength of the air stream set based on the control parameter therefor at the ejection time set based on the control parameter therefor.

Figure 8:
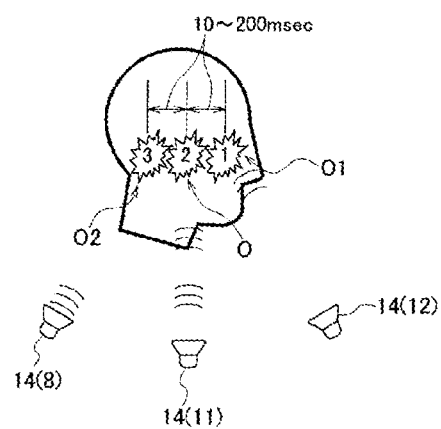
FIG. 8 is diagram illustrating an example of ejection of air streams toward the respective body sites of the user.
Figure 9:
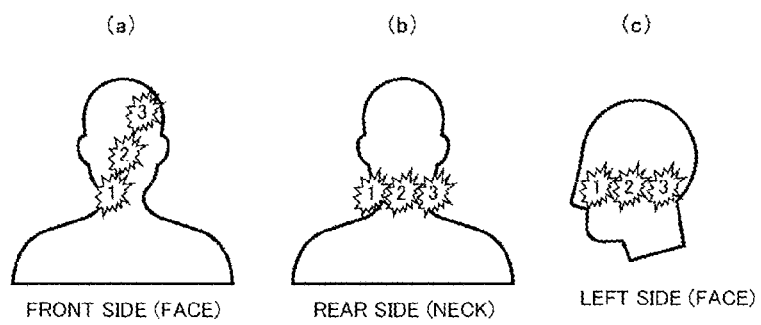
FIG. 9 is a diagram illustrating an example (another example) of the ejection of the air streams toward the respective body sites of the user.

In the case of the example described above, as illustrated in FIG. 8, at the set time t2−x, the air gun 14(12) ejects the air stream once toward the body site corresponding to O1(fx+α, fy) based on the distance r2 or the wind power strength 2. At the set time t2, the air gun 14(11) continuously ejects the air stream two or more times toward the body site corresponding to O(fx, fy) based on the distance r1 or the wind power strength 1. At the set time t2+x, the air gun 14(8) ejects the air stream once toward the body site corresponding to O2(fx−α, fy) based on the distance r2 or the wind power strength 2. For example, x is set within a range of 10 to 200 msec. Note that, instead of continuously ejecting the air stream twice, the air gun 14(11) may also eject the air stream once such that the amount, the speed, or both the amount and the speed of the ejected air stream are more than those of the air streams ejected by the air gun 14(12) and the air gun 14(8). The plurality of body sites is not limited to those in the profile of the user or in the left-right direction thereof. For example, as illustrated in FIG. 9, the plurality of body sites may also be in a vertical direction, an oblique direction, or the like of a front face or a rear neck of the user.

As a result, the user receives, in an extremely short period of time, a plurality of air streams having different strengths according to the normal position of the audio image at different body sites within a range of a region of the user. As a result, the user feels sensations of motion at the different body sites thereof, while simultaneously feels continuous wind resulting from the movement of the virtual target object. Therefore, it is possible to allow the user to feel the continuous wind without wearing a device. It is possible to allow the user to feel the continuous wind resulting from the movement of the virtual target object and realize staging that provides a sense of presence of the virtual target object.

Modification of Operation of Stimulus Presentation System 1

In the stimulus presentation device 13, the setting processing in which the control unit 132 sets the ejection times and the wind power strengths to the air guns 14 and the adjustment processing in which the adjustment unit 134 adjusts the ejection angles of the air guns 14 may be performed simultaneously or, alternatively, the adjustment processing may be performed before the setting processing. As described in [Second Modification of Configuration of Stimulus Presentation Device 13], both of the control unit 132 and the adjustment unit 134 may also be integrally configured as one functional unit, and accordingly the one functional unit may also determine the order in which the setting processing and the adjustment processing are performed.

Effects

According to the present embodiment, a stimulus presentation device 13 that stimulates a user with air from a plurality of air guns 14 arranged so as to surround the user includes a control unit 132 that determines respective ejection times at which a plurality of air streams are to be ejected at given time intervals which allow the user to perceive an apparent motion as well as respective ejection azimuth directions in which the plurality of air streams are to be ejected and causes the air streams to be sequentially ejected from the respective air guns 14 disposed in the individual ejection azimuth directions at the individual ejection times and an adjustment unit 134 that determines a plurality of different body sites on a body of the user to which the plurality of air streams are to be applied and adjusts respective ejection angles of the individual air guns 14 such that respective muzzles of the air guns 14 are pointed at the plurality of body sites. This allows the user to feel sensations of motion at the plurality of body sites and allows the user to feel the plurality of air streams as continuous wind. Therefore, it is possible to provide technology that allows the user to feel the continuous wind without wearing a device such as a head-mounted display.

Also, according to the present embodiment, the stimulus presentation device 13 further includes: an acquisition unit 131 that acquires, from an audio source reproduction device 11 that reproduces an audio source, audio image normal position information representing a normal position of an audio image perceived by the user, and each of the body sites corresponds to the normal position of the audio image. This allows the user to feel the plurality of air streams as continuous wind resulting from movement of a virtual target object. Therefore, it is possible to allow the user to feel the plurality of air streams as the continuous wind resulting from the movement of the virtual target object and realize staging that provides a sense of presence of the virtual target object.

Also, according to the present embodiment, the control unit 132 causes the air streams having the wind power strengths each corresponding to a magnitude of a distance between the user and the normal position of the audio image to be ejected from the respective air guns. Therefore, it is possible to allow the user to correctly feel the continuous wind resulting from the movement of the virtual target object according to the normal position of the audio image.

Also, according to the present embodiment, the control unit 132 changes the number of the air streams to be ejected toward one of the body sites and causes, when the number of the air streams to be ejected is plural, the plurality of air streams to be continuously ejected at given short time intervals. Therefore, it is possible to allow the user to correctly feel the continuous wind resulting from the movement of the virtual target object according to the normal position of the audio image.

Also, according to the present embodiment, the control unit 132 sets the given time intervals within a range of 10 to 200 msec. Therefore, it is possible to allow the user to feel a sufficient sensation of motion.

Also, according to the present embodiment, the adjustment unit 134 determines the plurality of body sites within a range of an exposed body region of the user. Therefore, it is possible to allow the user to feel a sufficient sensation of motion.

Others

Figure 10:
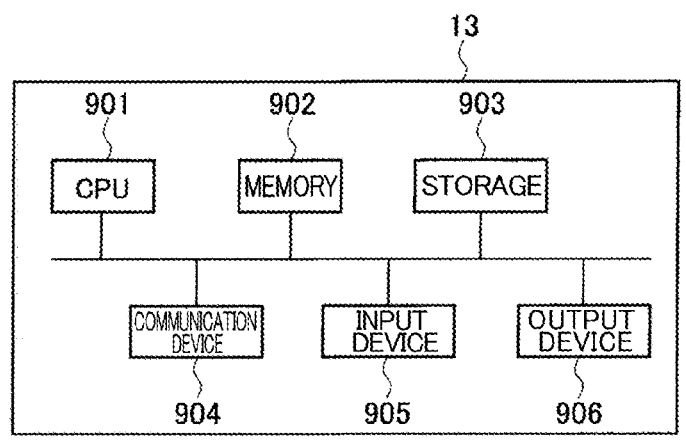
FIG. 10 is a diagram illustrating an example of a structure of the stimulus presentation device.

The present invention is not limited to the embodiment described above, and can variously be modified within the scope of the gist thereof. For the stimulus presentation device 13 in the present embodiment described above, as illustrated in, e.g., FIG. 10, a versatile computer system including a CPU 901, a memory 902, a storage 903 such as a HDD (Hard Disk Drive) or a SSD (Solid State Drive), a communication device 904, an input device 905, and an output device 906 can be used. The memory 902 and the storage 903 are storage devices. In the computer system, the CPU 901 executes a predetermined program loaded on the memory 902 to allow each of the functions of the stimulus presentation device 13 to be performed.

The stimulus presentation device 13 may be implemented by either one computer or a plurality of computers. The stimulus presentation device 13 may also be a virtual machine to be mounted on a computer. A program for the stimulus presentation device 13 may be either stored in a computer readable recording medium such as a HDD, a SSD, a USB (Universal Serial Bus) memory, a CD (Compact Disc), or a DVD (Digital Versatile Disc) or delivered via a network.

REFERENCE SIGNS LIST

1 Stimulus presentation system
11 Audio source reproduction device
12 Video camera
13 Stimulus presentation device
14 Air gun
131 Acquisition unit
132 Control unit
133 Determination unit
134 Adjustment unit
901 CPU
902 Memory
903 Storage
904 Communication device
905 Input device
906 Output device

The invention claimed is:
1. A stimulus presentation device for stimulating a user with air from a plurality of air guns arranged so as to surround the user, the stimulus presentation device comprising:
a control unit, including one or more processors, configured to determine respective ejection times at which a plurality of air streams is to be ejected at given time intervals which allow the user to perceive an apparent motion as well as respective ejection azimuth directions in which the plurality of air streams are to be ejected and causes the air streams to be sequentially ejected from the respective air guns disposed in the respective ejection azimuth directions at the respective ejection times; and
an adjustment unit, including one or more processors, configured to (i) determine a plurality of different body sites on a body of the user to which the plurality of air streams is to be applied and (ii) adjust respective ejection angles of the individual air guns by controlling respective orientations of respective muzzles of the air guns to point the respective muzzles at the plurality of body sites.

2. The stimulus presentation device according to claim 1, further comprising:
an acquisition unit, including one or more processors, configured to acquire, from an audio source reproduction device that reproduces an audio source, audio image normal position information representing a normal position of an audio image perceived by the user, wherein
each of the body sites corresponds to the normal position of the audio image.

3. The stimulus presentation device according to claim 2, wherein the control unit is configured to cause the air streams having wind power strengths each corresponding to a magnitude of a distance between the user and the normal position of the audio image to be ejected from the respective air guns.

4. The stimulus presentation device according to claim 1, wherein the control unit is configured to change the number of the air streams to be ejected toward one of the body sites and cause, when the number of the air streams to be ejected is plural, the plurality of air streams to be continuously ejected at given short time intervals.

5. The stimulus presentation device according to claim 1, wherein the control unit is configured to set the given time intervals within a range of 10 to 200 msec.

6. The stimulus presentation device according to claim 1, wherein the adjustment unit is configured to determine the plurality of body sites within a range of an exposed body region of the user.

7. The stimulus presentation device according to claim 1, further comprising:
a determination unit, including one or more processors, configured to:
receive, from a plurality of video cameras arranged surrounding the user, a plurality of videos of the user at different angles; and
determining, from the plurality of videos of the user, an exposed body region of the user that is not covered by clothing; wherein:
the adjustment unit is configured to determine the plurality of body sites within a range of the exposed body region determined by the determination unit.

8. A stimulus presentation method for stimulating a user with air from a plurality of air guns arranged so as to surround the user, the stimulus presentation method causing a stimulus presentation device to perform the steps of:
determining respective ejection times at which a plurality of air streams is to be ejected at given time intervals which allow the user to perceive an apparent motion as well as respective ejection azimuth directions in which the plurality of air streams are to be ejected and causing the air streams to be sequentially ejected from the respective air guns arranged in the respective ejection azimuth directions at the respective ejection times;
determining a plurality of different body sites on a body of the user to which the plurality of air streams is to be applied; and
adjusting respective ejection angles of the individual air guns by controlling respective orientations of respective muzzles of the air guns to point the respective muzzles at the plurality of body sites.

9. The stimulus presentation method according to claim 8, further comprising:
acquiring, from an audio source reproduction device that reproduces an audio source, audio image normal position information representing a normal position of an audio image perceived by the user, wherein
each of the body sites corresponds to the normal position of the audio image.

10. The stimulus presentation method according to claim 9, further comprising:
causing the air streams having wind power strengths each corresponding to a magnitude of a distance between the user and the normal position of the audio image to be ejected from the respective air guns.

11. The stimulus presentation method according to claim 8, further comprising:
changing the number of the air streams to be ejected toward one of the body sites and causing, when the number of the air streams to be ejected is plural, the plurality of air streams to be continuously ejected at given short time intervals.

12. The stimulus presentation method according to claim 8, further comprising:
setting the given time intervals within a range of 10 to 200 msec.

13. The stimulus presentation method according to claim 8, further comprising:
determining the plurality of body sites within a range of an exposed body region of the user.

14. A non-transitory computer readable medium storing a stimulus presentation program that causes a computer to function as a stimulus presentation device to perform:
determining respective ejection times at which a plurality of air streams is to be ejected at given time intervals which allow a user to perceive an apparent motion as well as respective ejection azimuth directions in which the plurality of air streams are to be ejected and causing the air streams to be sequentially ejected from respective air guns arranged in the respective ejection azimuth directions at the respective ejection times;
determining a plurality of different body sites on a body of the user to which the plurality of air streams is to be applied; and
adjusting respective ejection angles of the individual air guns by controlling respective orientations of respective muzzles of the air guns to point the respective muzzles at the plurality of body sites.

15. The non-transitory computer readable medium according to claim 14, wherein the stimulus presentation program further causes the computer to perform:
acquiring, from an audio source reproduction device that reproduces an audio source, audio image normal position information representing a normal position of an audio image perceived by the user, wherein
each of the body sites corresponds to the normal position of the audio image.

16. The non-transitory computer readable medium according to claim 15, wherein the stimulus presentation program further causes the computer to perform:
causing the air streams having wind power strengths each corresponding to a magnitude of a distance between the user and the normal position of the audio image to be ejected from the respective air guns.

17. The non-transitory computer readable medium according to claim 14, wherein the stimulus presentation program further causes the computer to perform:
changing the number of the air streams to be ejected toward one of the body sites and causing, when the number of the air streams to be ejected is plural, the plurality of air streams to be continuously ejected at given short time intervals.

18. The non-transitory computer readable medium according to claim 14, wherein the stimulus presentation program further causes the computer to perform:
   setting the given time intervals within a range of 10 to 200 msec.

19. The non-transitory computer readable medium according to claim 14, wherein the stimulus presentation program further causes the computer to perform:
   determining the plurality of body sites within a range of an exposed body region of the user.

* * * * *